United States Patent
Yu

(10) Patent No.: US 9,285,616 B2
(45) Date of Patent: Mar. 15, 2016

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventor: Gang Yu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 90 days.

(21) Appl. No.: 14/241,073

(22) PCT Filed: Jan. 13, 2014

(86) PCT No.: PCT/CN2014/070502
§ 371 (c)(1),
(2) Date: Feb. 25, 2014

(87) PCT Pub. No.: WO2015/070530
PCT Pub. Date: May 21, 2015

(65) Prior Publication Data
US 2015/0277178 A1    Oct. 1, 2015

(30) Foreign Application Priority Data
Nov. 15, 2013    (CN) .......................... 2013 1 0573170

(51) Int. Cl.
*G02F 1/1335* (2006.01)
*G02F 1/1333* (2006.01)
*F21V 8/00* (2006.01)

(52) U.S. Cl.
CPC ........ *G02F 1/133308* (2013.01); *G02B 6/0055* (2013.01); *G02B 6/0088* (2013.01); *G02F 2001/133314* (2013.01); *G02F 2001/133317* (2013.01)

(58) Field of Classification Search
CPC ................ G02B 6/0055; G02B 6/0088; G02F 2001/133314; G02F 2001/133317; G02F 1/133308
USPC ..................................................... 349/58–68
See application file for complete search history.

(56) References Cited

U.S. PATENT DOCUMENTS

| | | | |
|---|---|---|---|
| 6,853,410 B2* | 2/2005 | Matsuda et al. | 349/67 |
| 2007/0230217 A1* | 10/2007 | Sakaki | G02B 6/0031 362/624 |
| 2010/0085507 A1 | 4/2010 | Cho et al. | |
| 2012/0249892 A1 | 10/2012 | Kono | |

FOREIGN PATENT DOCUMENTS

| | | |
|---|---|---|
| CN | 101363996 A | 2/2009 |
| CN | 202432357 U | 9/2012 |

* cited by examiner

*Primary Examiner* — Charles Chang
(74) *Attorney, Agent, or Firm* — Andrew C. Cheng

(57) ABSTRACT

The present invention provides a backlight module and a liquid crystal display device using the backlight module. The backlight module includes: a backplane (2), a backlight source (4) arranged in the backplane (2), a light guide plate (6) arranged in the backplane (2), and a reflector plate (8) arranged between the backplane (2) and the light guide plate (6). The backplane (2) includes a bottom plate (22) and a plurality of side plates (24) perpendicularly connected to the bottom plate (22). The bottom plate (22) has a surface that faces the light guide plate (6) and is an arc curved surface (222). The reflector plate (8) is positioned on the arc curved surface (222) and shows an arc curved configuration. The light guide plate (6) is supported on opposite ends of the reflector plate (8) to effectively reduce the thickness of the backlight module and not to be in complete contact with the reflector plate to thereby effectively prevent the occurrence of abrasion and wear of the light guide plate resulting from insufficient smoothness of the bottom plate of the backplane and effectively extend the lifespan of the backlight module.

15 Claims, 4 Drawing Sheets

BACKLIGHT MODULE AND LIQUID CRYSTAL DISPLAY DEVICE USING SAME

BACKGROUND OF THE INVENTION

1. Field of the Invention

The present invention relates to the field of liquid crystal displaying, and in particular to a backlight module and a liquid crystal display device using the backlight module.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, a number of tiny vertical and horizontal electrical wires are arranged between the two glass substrates to selectively receive application of electricity thereto to control the rotation direction of the liquid crystal molecules in order to refract out light emitting from the backlight module for generating images. Since the liquid crystal display panel itself does not emit light, light must be provided by the backlight module in order to normally display images. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal display panel to form a planar light source directly supplied to the liquid crystal display panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

Thinning is the current trend of development of the liquid crystal display devices. Referring to FIG. 1, a schematic view is given to show the structure of a conventional thinned liquid crystal display device, which comprises: a backlight source 100, a mold frame 300 arranged on the backlight module 100, and a liquid crystal display panel 500 arranged on the mold frame 300. The backlight source 100 comprises: a backplane 102, a light guide plate 104 arranged in the backplane 102, a backlight source 106 arranged in the light guide plate 104, and a reflector plate 108 arranged between a bottom plate 122 of the backplane 102 and the light guide plate 104. The light guide plate 104 is directly positioned on the reflector plate 108. The light guide plate 104 has a bottom surface 142 that forms no gap with respect to the reflector plate 108 in order to reduce the thickness of the liquid crystal display device for realizing thinning of the liquid crystal display device.

However, when the surface of the bottom plate 122 of the backplane 102 that faces the reflector plate 108 is not sufficiently smooth (such as having raised portions), the reflector plate 108 would be raised up thereby increasing friction between the reflector plate 108 and the light guide plate 104 and thus readily leading to damage of the light guide plate 104.

SUMMARY OF THE INVENTION

An object of the present invention is to provide a backlight module, which reduces the thickness of the backlight module, lowers down the manufacturing costs, helping achieve device thinning, and also preventing damage of a light guide plate resulting from friction caused between a reflector plate and the light guide plate due to surface roughness of a bottom plate, so as to extend the life span of the light guide plate.

Another object of the present invention is to provide a liquid crystal display device, which reduces the thickness of the liquid crystal display device, lowers down the manufacturing costs, helping achieve thinning of the liquid crystal display device, and also preventing damage of a light guide plate resulting from friction caused between a reflector plate and the light guide plate due to surface roughness of a bottom plate, so as to extend the life span of the light guide plate.

To achieve the above objects, the present invention provides a backlight module, which comprises: a backplane, a backlight source arranged in the backplane, a light guide plate arranged in the backplane, and a reflector plate arranged between the backplane and the light guide plate. The backplane comprises a bottom plate and a plurality of side plates perpendicularly connected to the bottom plate. The bottom plate has a surface that faces the light guide plate and is an arc curved surface. The reflector plate is positioned on the arc curved surface and shows an arc curved configuration. The light guide plate is supported on opposite ends of the reflector plate.

The light guide plate comprises a bottom surface facing the bottom plate, a top surface opposite to the bottom surface, and a plurality of side surfaces between the bottom surface and the top surface. The plurality of side surfaces comprises at least a light incidence surface. The backlight source is mounted to the side plates and beside the light incidence surface.

The backlight module further comprises an optical film assembly arranged above the light guide plate.

The present invention also provides a liquid crystal display device, which comprises: a backlight module, a mold frame arranged on the backlight module, and a liquid crystal display panel arranged on the mold frame. The backlight module comprises: a backplane, a backlight source arranged in the backplane, a light guide plate arranged in the backplane, and a reflector plate arranged between the backplane and the light guide plate. The backplane comprises a bottom plate and a plurality of side plates perpendicularly connected to the bottom plate. The bottom plate has a surface that faces the light guide plate and is an arc curved surface. The reflector plate is positioned on the arc curved surface and shows an arc curved configuration. The light guide plate is supported on opposite ends of the reflector plate.

The light guide plate comprises a bottom surface facing the bottom plate, a top surface opposite to the bottom surface, and a plurality of side surfaces between the bottom surface and the top surface. The plurality of side surfaces comprises at least a light incidence surface. The backlight source is mounted to the side plates and beside the light incidence surface.

The backlight module further comprises an optical film assembly arranged above the light guide plate.

The liquid crystal display panel comprises a TFT substrate, a CF substrate that is opposite to and laminated on the TFT substrate, and a liquid crystal layer arranged between the TFT substrate and the CF substrate.

The TFT substrate comprises a first substrate, a thin-film transistor formed on a surface of the first substrate, and a first polarizer formed on an opposite surface of the first substrate; and the CF substrate comprises a second substrate, a color filter formed on a surface of the second substrate, and a second polarizer formed on an opposite surface of the second substrate.

The first substrate and the second substrate are both glass substrates.

The liquid crystal display device further comprises a front bezel arranged on the liquid crystal display panel.

The present invention further provides a liquid crystal display device, which comprises: a backlight module, a mold frame arranged on the backlight module, and a liquid crystal display panel arranged on the mold frame, the backlight module comprising: a backplane, a backlight source arranged in the backplane, a light guide plate arranged in the backplane, and a reflector plate arranged between the backplane and the light guide plate, the backplane comprising a bottom plate and a plurality of side plates perpendicularly connected to the bottom plate, the bottom plate having a surface that faces the light guide plate and is an arc curved surface, the reflector plate being positioned on the arc curved surface and showing an arc curved configuration, the light guide plate being supported on opposite ends of the reflector plate;

wherein the light guide plate comprises a bottom surface facing the bottom plate, a top surface opposite to the bottom surface, and a plurality of side surfaces between the bottom surface and the top surface, the plurality of side surfaces comprising at least a light incidence surface, the backlight source being mounted to the side plates and beside the light incidence surface; and wherein the backlight module further comprises an optical film assembly arranged above the light guide plate.

The liquid crystal display panel comprises a TFT substrate, a CF substrate that is opposite to and laminated on the TFT substrate, and a liquid crystal layer arranged between the TFT substrate and the CF substrate.

The TFT substrate comprises a first substrate, a thin-film transistor formed on a surface of the first substrate, and a first polarizer formed on an opposite surface of the first substrate; and the CF substrate comprises a second substrate, a color filter formed on a surface of the second substrate, and a second polarizer formed on an opposite surface of the second substrate.

The first substrate and the second substrate are both glass substrates.

The liquid crystal display device further comprises a front bezel arranged on the liquid crystal display panel.

The efficacy of the present invention is that the present invention provides a backlight module and a liquid crystal display device using the backlight module, in which a bottom plate of a backplane is formed with an arc curved surface and a reflector plate is positioned on the arc curved surface to make the reflector plate configured in an arc curved shape for enhancing the effect of light reflection and, further, a light guide plate is directly supported on two ends of the reflector plate to effectively reduced the thickness of the backlight module and is not in complete contact with the reflector plate to effectively prevent abrasion and wear of the light guide plate resulting from insufficient smoothness of the bottom plate of the backplane thereby effectively extending the life span of the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
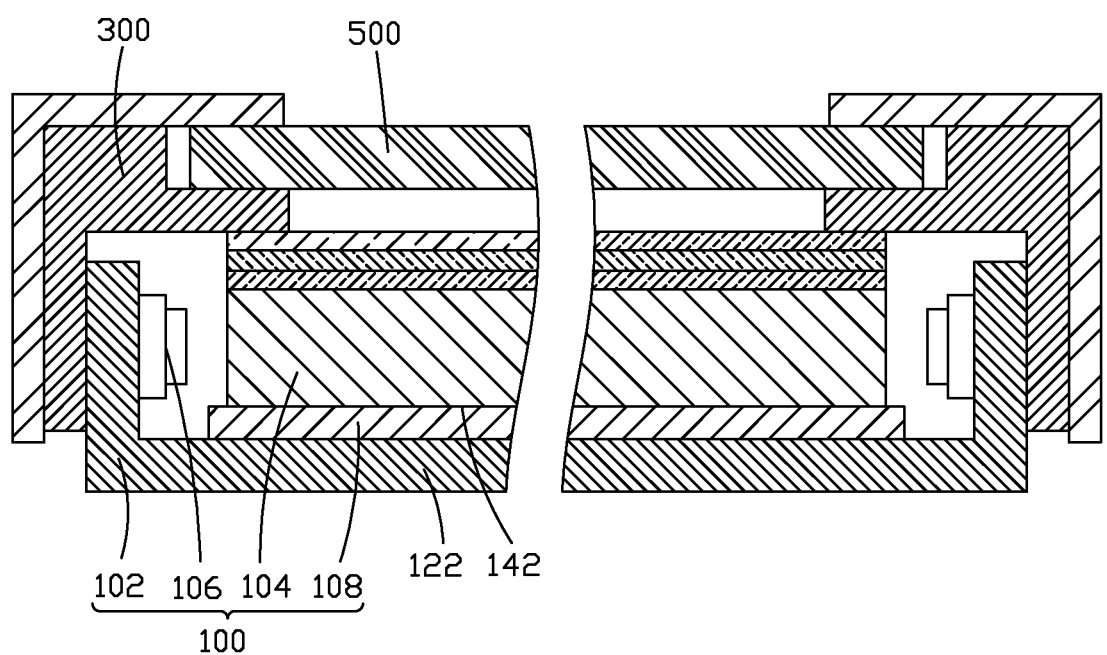
FIG. 1 is a schematic view showing the structure of a conventional liquid crystal display device.
Figure 2:
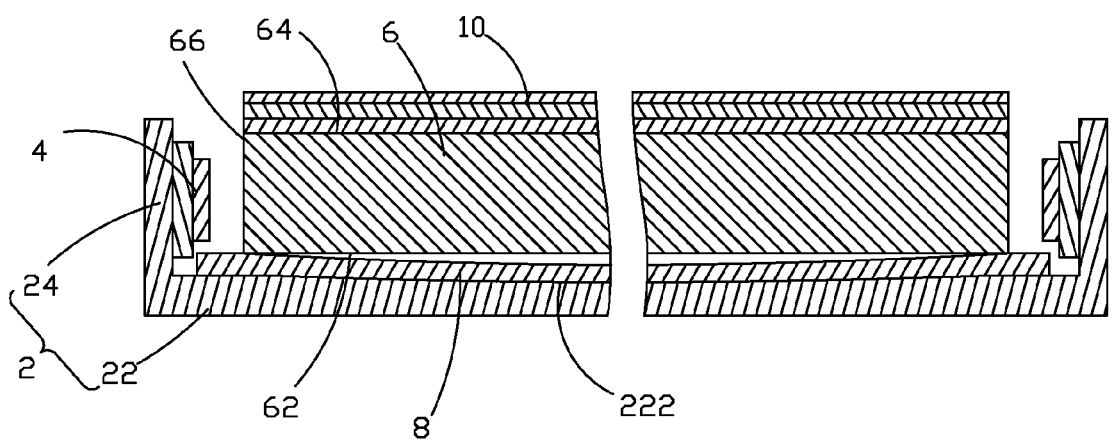
FIG. 2 is a schematic view showing the structure of a backlight module according to the present invention.

Referring to FIG. 2, the present invention provides a backlight module, which comprises: a backplane 2, a backlight source 4 arranged in the backplane 2, a light guide plate 6 arranged in the backplane 2, and a reflector plate 8 arranged between the backplane 2 and the light guide plate 6. The backplane 2 comprises a bottom plate 22 and a plurality of side plates 24 perpendicularly connected to the bottom plate 22. The bottom plate 22 has a surface that faces the light guide plate 6 and is an arc curved surface 222. The reflector plate 8 is positioned on the arc curved surface 222 and shows an arc curved configuration. The light guide plate 6 is supported on opposite ends of the reflector plate 8. Since the reflector plate 8 is configured in an arc curved shape, the performance of light reflection can be improved and also, the light guide plate 6 is directly supported on two ends of the reflector plate 8 so that while the thickness of the backlight module is reduced, the light guide plate 6 and the reflector plate 8 are set in incomplete contact with each other to effectively prevent abrasion and wear of the light guide plate 6 resulting from insufficient smoothness of the bottom plate 22 of the backplane 2 and effectively extend the lifespan of the backlight module.

Further, the light guide plate 6 comprises a bottom surface 62 facing the bottom plate 22, a top surface 64 opposite to the bottom surface 62, and a plurality of side surfaces between the bottom surface 62 and the top surface 64. The plurality of side surfaces comprises at least a light incidence surface 66. The backlight source 4 is mounted to the side plates 24 and beside the light incidence surface 66. In the instant embodiment, two light incidence surfaces 66 are provided and also, two backlight sources 4 are provided correspondingly to constitute a side-edge backlight module having two-side light incidence.

It is noted that the backlight module of the present invention further comprises an optical film assembly 10 arranged above the light guide plate 6 to enhance the illumination intensity emitting from the backlight module and illumination homogeneity.

Figure 3:
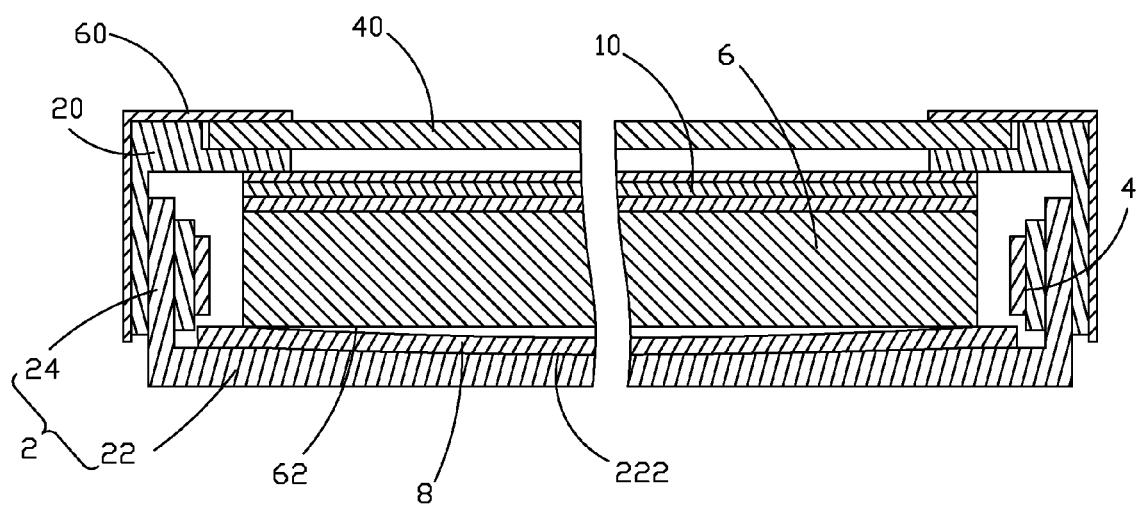
FIG. 3 is a schematic view showing the structure of a liquid crystal display device according to the present invention.
Figure 4:
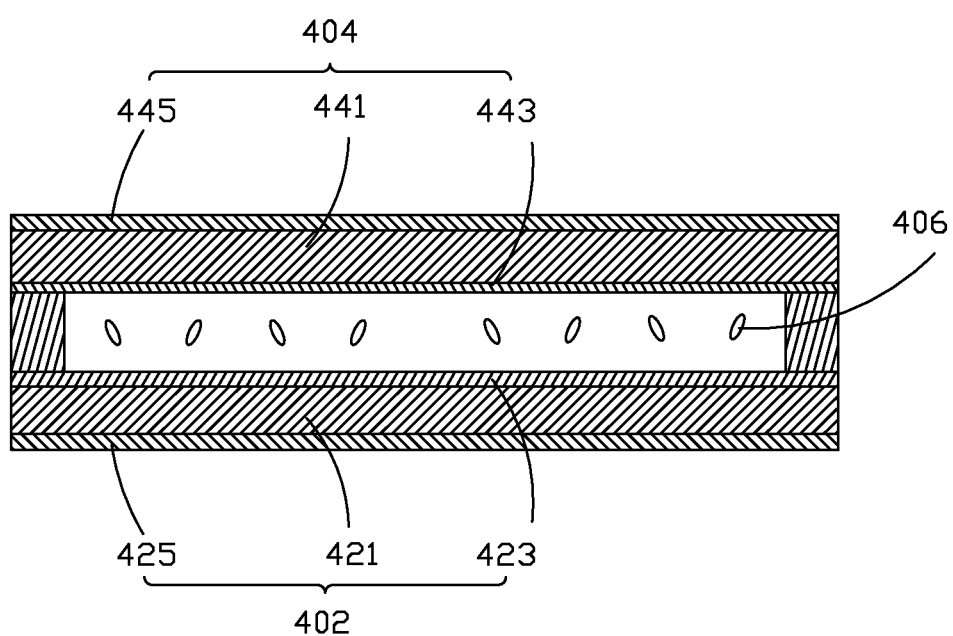
FIG. 4 is a schematic view showing the structure of a liquid crystal display panel of FIG. 3.

Referring to FIGS. 3 and 4, a liquid crystal display device comprises: a backlight module, a mold frame 20 arranged on the backlight module, and a liquid crystal display panel 40 arranged on the mold frame 20. The backlight module comprises: a backplane 2, a backlight source 4 arranged in the backplane 2, a light guide plate 6 arranged in the backplane 2, and a reflector plate 8 arranged between the backplane 2 and the light guide plate 6. The backplane 2 comprises a bottom plate 22 and a plurality of side plates 24 perpendicularly connected to the bottom plate 22. The bottom plate 22 has a surface that faces the light guide plate 6 and is an arc curved surface 222. The reflector plate 8 is positioned on the arc curved surface 222 and shows an arc curved configuration. The light guide plate 6 is supported on opposite ends of the reflector plate 8. Since the reflector plate 8 is configured in an arc curved shape, the performance of light reflection can be improved and also, the light guide plate 6 is directly supported on two ends of the reflector plate 8 so that while the thickness of the backlight module is reduced, the light guide plate 6 and the reflector plate 8 are set in incomplete contact with each other to effectively prevent abrasion and wear of the light guide plate 6 resulting from insufficient smoothness of the bottom plate 22 of the backplane 2 and effectively extend the lifespan of the backlight module.

Further, the light guide plate 6 comprises a bottom surface 62 facing the bottom plate 22, a top surface 64 opposite to the bottom surface 62, and a plurality of side surfaces between the bottom surface 62 and the top surface 64. The plurality of side surfaces comprises at least a light incidence surface 66. The backlight source 4 is mounted to the side plates 24 and beside the light incidence surface 66. In the instant embodiment, two light incidence surfaces 66 are provided and also, two backlight sources 4 are provided correspondingly to constitute a side-edge backlight module having two-side light incidence.

It is noted that the backlight module of the present invention further comprises an optical film assembly 10 arranged above the light guide plate 6 to enhance the illumination intensity emitting from the backlight module and illumination homogeneity.

Specifically, referring to FIG. 4, the liquid crystal display panel 40 comprises a TFT (Thin-Film Transistor) substrate 402, a CF (Color Filter) substrate 404 that is opposite to and laminated on the TFT substrate 402, and a liquid crystal layer 406 arranged between the TFT substrate 402 and the CF substrate 404. The TFT substrate 402 functions to drive liquid crystal molecules of the liquid crystal layer 406 to rotate in order to achieve selection of light. The CF substrate 404 realizes color displaying.

Further, the TFT substrate 402 comprises a first substrate 421, a thin-film transistor 423 formed on a surface of the first substrate 421, and a first polarizer 425 formed on an opposite surface of the first substrate 421. The CF substrate 404 comprises a second substrate 441, a color filter 443 formed on a surface of the second substrate 441, and a second polarizer 445 formed on an opposite surface of the second substrate 441.

In the instant embodiment, the first substrate 421 and the second substrate 441 are both glass substrates.

It is noted that the liquid crystal display device further comprises a front bezel 60 arranged on the liquid crystal display panel 40 for fixing the liquid crystal display panel 40 in the mold frame 20.

In summary, the present invention provides a backlight module and a liquid crystal display device using the backlight module, in which a bottom plate of a backplane is formed with an arc curved surface and a reflector plate is positioned on the arc curved surface to make the reflector plate configured in an arc curved shape for enhancing the effect of light reflection and, further, a light guide plate is directly supported on two ends of the reflector plate to effectively reduce the thickness of the backlight module and is not in complete contact with the reflector plate to effectively prevent abrasion and wear of the light guide plate resulting from insufficient smoothness of the bottom plate of the backplane thereby effectively extending the life span of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a backlight source arranged in the backplane, a light guide plate arranged in the backplane, and a reflector plate arranged between the backplane and the light guide plate, the backplane comprising a bottom plate and a plurality of side plates perpendicularly connected to the bottom plate, the bottom plate having a surface forming a recess that faces the light guide plate and has an arc curved surface, the reflector plate being positioned on the arc curved surface and having opposite ends supporting the light guide plate and a middle portion between the ends and showing an arc curved configuration.

2. The backlight module as claimed in claim 1, wherein the light guide plate comprises a bottom surface facing the bottom plate, a top surface opposite to the bottom surface, and a plurality of side surfaces between the bottom surface and the top surface, the plurality of side surfaces comprising at least a light incidence surface, the backlight source being mounted to the side plates and beside the light incidence surface.

3. The backlight module as claimed in claim 1 further comprising an optical film assembly arranged above the light guide plate.

4. A liquid crystal display device, comprising: a backlight module, a mold frame arranged on the backlight module, and a liquid crystal display panel arranged on the mold frame, the backlight module comprising: a backplane, a backlight source arranged in the backplane, a light guide plate arranged in the backplane, and a reflector plate arranged between the backplane and the light guide plate, the backplane comprising a bottom plate and a plurality of side plates perpendicularly connected to the bottom plate, the bottom plate having a surface forming a recess that faces the light guide plate and has an arc curved surface, the reflector plate being positioned on the arc curved surface and having opposite ends supporting the light guide plate and a middle portion between the ends and showing an arc curved configuration.

5. The liquid crystal display device as claimed in claim 4, wherein the light guide plate comprises a bottom surface facing the bottom plate, a top surface opposite to the bottom surface, and a plurality of side surfaces between the bottom surface and the top surface, the plurality of side surfaces comprising at least a light incidence surface, the backlight source being mounted to the side plates and beside the light incidence surface.

6. The liquid crystal display device as claimed in claim 4, wherein the backlight module further comprises an optical film assembly arranged above the light guide plate.

7. The liquid crystal display device as claimed in claim 4, wherein the liquid crystal display panel comprises a TFT (Thin-Film Transistor) substrate, a CF (Color Filter) substrate that is opposite to and laminated on the TFT substrate, and a liquid crystal layer arranged between the TFT substrate and the CF substrate.

8. The liquid crystal display device as claimed in claim 7, wherein the TFT substrate comprises a first substrate, a thin-film transistor formed on a surface of the first substrate, and a first polarizer formed on an opposite surface of the first substrate; and the CF substrate comprises a second substrate, a color filter formed on a surface of the second substrate, and a second polarizer formed on an opposite surface of the second substrate.

9. The liquid crystal display device as claimed in claim 8, wherein the first substrate and the second substrate are both glass substrates.

10. The liquid crystal display device as claimed in claim 4 further comprising a front bezel arranged on the liquid crystal display panel.

11. A liquid crystal display device, comprising: a backlight module, a mold frame arranged on the backlight module, and a liquid crystal display panel arranged on the mold frame, the backlight module comprising: a backplane, a backlight source arranged in the backplane, a light guide plate arranged in the backplane, and a reflector plate arranged between the backplane and the light guide plate, the backplane comprising a bottom plate and a plurality of side plates perpendicularly connected to the bottom plate, the bottom plate having a surface forming a recess that faces the light guide plate and has an arc curved surface, the reflector plate being positioned on the arc curved surface and having opposite ends supporting the light guide plate and a middle portion between the ends and showing an arc curved configuration;

wherein the light guide plate comprises a bottom surface facing the bottom plate, a top surface opposite to the bottom surface, and a plurality of side surfaces between the bottom surface and the top surface, the plurality of side surfaces comprising at least a light incidence surface, the backlight source being mounted to the side plates and beside the light incidence surface; and wherein the backlight module further comprises an optical film assembly arranged above the light guide plate.

12. The liquid crystal display device as claimed in claim 11, wherein the liquid crystal display panel comprises a TFT (Thin-Film Transistor) substrate, a CF (Color Filter) substrate that is opposite to and laminated on the TFT substrate, and a liquid crystal layer arranged between the TFT substrate and the CF substrate.

13. The liquid crystal display device as claimed in claim 12, wherein the TFT substrate comprises a first substrate, a thin-film transistor formed on a surface of the first substrate, and a first polarizer formed on an opposite surface of the first substrate; and the CF substrate comprises a second substrate, a color filter formed on a surface of the second substrate, and a second polarizer formed on an opposite surface of the second substrate.

14. The liquid crystal display device as claimed in claim 13, wherein the first substrate and the second substrate are both glass substrates.

15. The liquid crystal display device as claimed in claim 11 further comprising a front bezel arranged on the liquid crystal display panel.

* * * * *